United States Patent

Alfille et al.

[11] Patent Number: 5,905,832
[45] Date of Patent: May 18, 1999

[54] DEVICE FOR INJECTING HIGH ENERGY LASER BEAM INTO OPTICAL FIBER

[75] Inventors: Jean-Pascal Alfille, Clamart; Jacques Schildknecht, Massy; Bernard Stockmann, Sainte Genevieve des Bois, all of France

[73] Assignee: Commissarait a L'Energie Atomique, France

[21] Appl. No.: 08/754,084

[22] Filed: Nov. 20, 1996

[30] Foreign Application Priority Data

Dec. 13, 1995 [FR] France ................................ 95 14746

[51] Int. Cl.$^6$ .................................................. G02B 6/36
[52] U.S. Cl. ................................. 385/92; 385/56; 385/62
[58] Field of Search ............................ 385/92, 56, 58, 385/62, 81, 86, 87, 78

[56] References Cited

U.S. PATENT DOCUMENTS

| | | | |
|---|---|---|---|
| 4,519,390 | 5/1985 | Horne | 128/303.1 |
| 5,142,600 | 8/1992 | Ortiz, Jr. | 385/83 |
| 5,214,732 | 5/1993 | Beard et al. | 385/78 |
| 5,291,570 | 3/1994 | Filgas et al. | 385/78 |
| 5,577,146 | 11/1996 | Musk | 385/92 X |

FOREIGN PATENT DOCUMENTS

| | | |
|---|---|---|
| 4028305 | 10/1992 | Germany . |
| 59-42504 | 3/1984 | Japan . |
| 59-121007 | 7/1984 | Japan . |
| 60-028607 | 2/1985 | Japan . |
| 2255199 | 10/1992 | United Kingdom . |

Primary Examiner—Phan T. H. Palmer
Attorney, Agent, or Firm—Hayes, Soloway, Hennessey, Grossman & Hage. P.C.

[57] ABSTRACT

A connection device for injecting a laser beam into an optical fiber is provided. The device includes two half grips for receiving one end of the optical fiber in a gripped position, a connector body for receiving the grips and for holding them in an optical fiber gripped position, and a conduction cooling mechanism for cooling the two half grips.

18 Claims, 5 Drawing Sheets

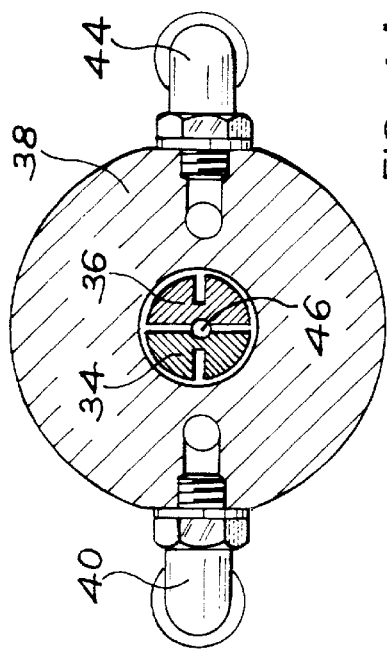
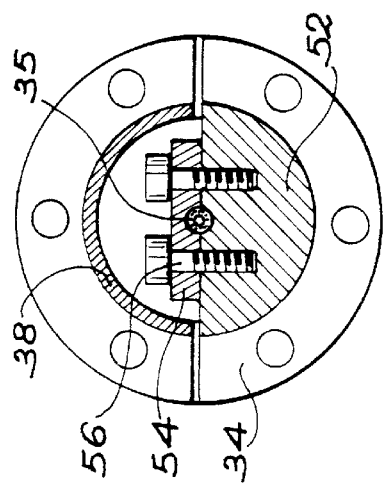
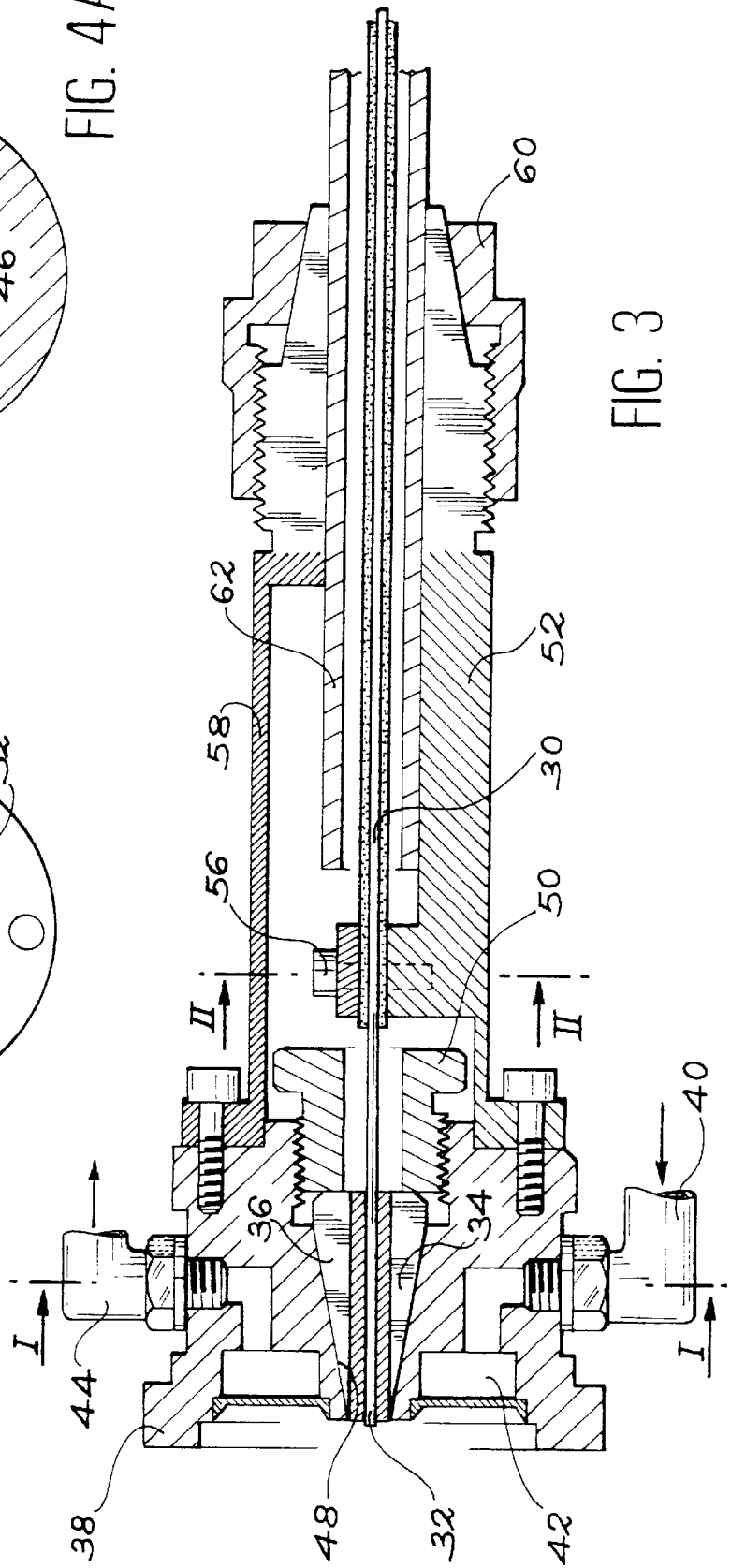
FIG. 4A
FIG. 4B
FIG. 3

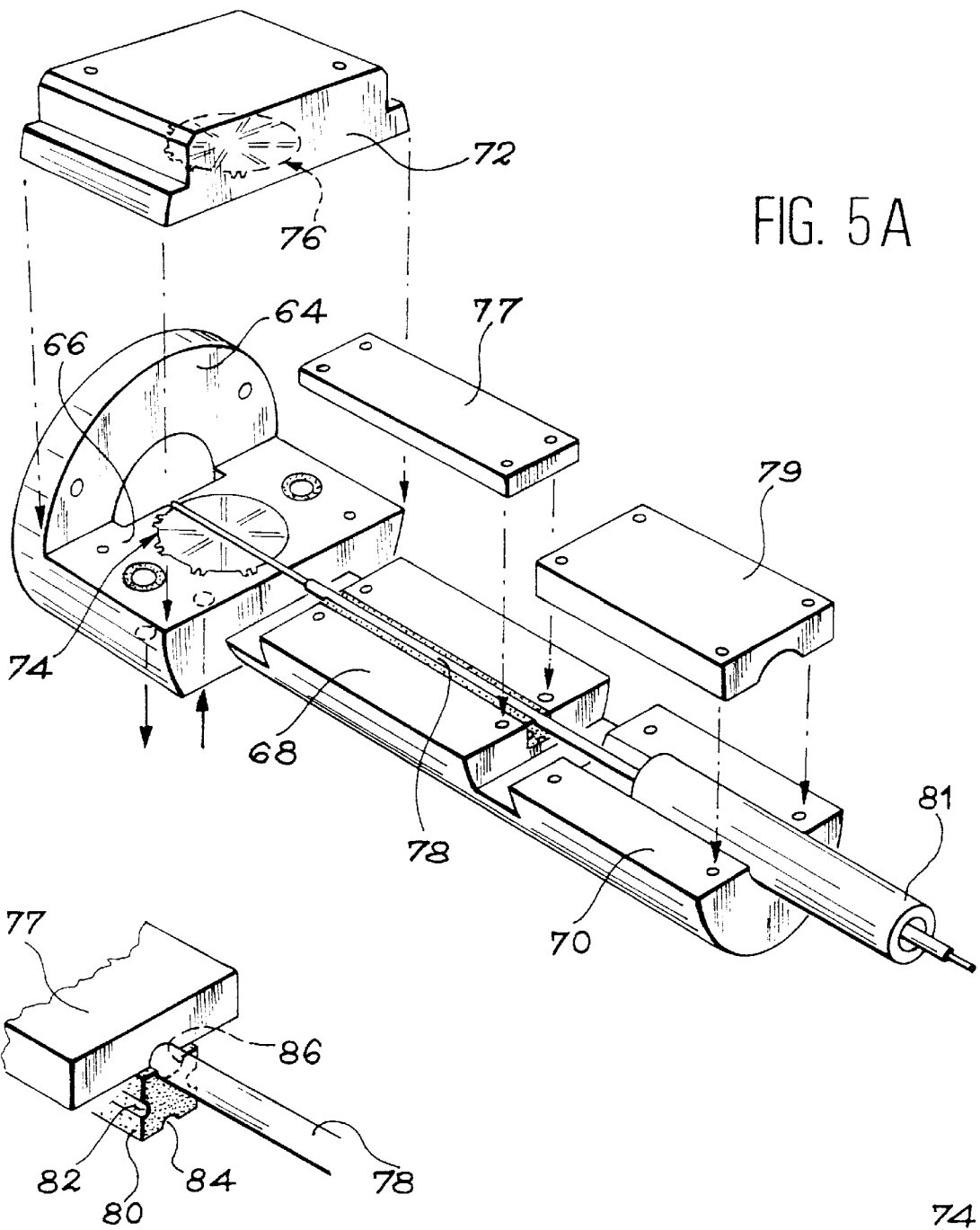
FIG. 5A
FIG. 5B
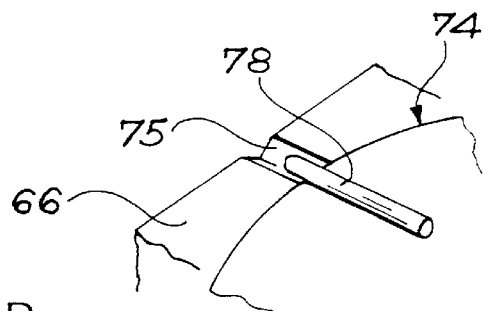
FIG. 5C

DEVICE FOR INJECTING HIGH ENERGY LASER BEAM INTO OPTICAL FIBER

BACKGROUND OF THE INVENTION

1. Field of the Invention

This invention relates to the field of optical fiber connectors that permit introduction of a laser beam into an optical fiber.

2. Brief Description of Related Prior Art

A functional diagram of a device for injecting a laser beam into an optical fiber is shown in FIG. 1. As shown in this diagram, the device is made up of:

a convergent optical system 2 for allowing an incident laser beam 4 to be focused onto the input surface 6 of a fiber 8, an adjustable mechanical coupling 10 (an interface collar) between the optical system 2 and the fiber connector 12, that permits adjustments for centering the focused beam on the input surface of the fiber, and finally an optical fiber connector 12, which has a first fliction of creating a link between an optical component (the end at the optical fiber) and the mechanical coupling 10.

Document U.S. Pat. No. 5,291,570 describes a fiber connector for a continuous high energy laser shown diagrammatically in FIG. 2. A laser beam 14 passes into an optical fiber 16 through one of its ends. The external part of the connector is made up of a body 18. The end of the fiber is chamfered and protected by a sleeve 20. The sleeve is made of a material that is transparent to the wavelength of laser beam 14. Reference number 22 designates the area of contact of the sleeve with the end of the fiber.

Beyond this contact area 22, the fiber 16 and the sleeve 20 are separated by an air gap 24. The fraction of the beam 14 that does not pass into the interior of the fiber passes through the transparent sleeve 20. This parasitic beam is reflected by component 26 towards the body 18. This body is built of a material that is a good conductor of heat.

Document DE-40 28305 describes a fiber connector for a high energy laser. This device has the objective of automatically centering the end of the fiber with respect to the incident beam. A special bimetallic grip, with three branches, exerts a radial force on the end of the fiber when one of the branches receives a greater fraction of the beam. Hence the centering of the beam is automatic.

Although satisfactory in certain respects, these two devices nevertheless pose problems, particularly when high energy lasers are used, for example, a pulsed YAG laser. The YAG laser emits a beam with a wavelength of 1.06 μm, which wavelength can be transported by an optical fiber. The diameter of the fibers used is, in general, 1 mm for a YAG 1 kW pulsed laser.

Compared with a continuous YAG laser, the mean power of the industrial YAG pulsed laser is actually less (1 to 2 kW). Even so, the quality of its beam is not so good.

The YAG pulsed laser is characterised by three parameters which control the laser pulse:

the energy per pulse (for example from 1 to 140 J), the duration of the pulse (for example from 0.5 to 20 ms), the repetition frequency (for example from 1 to 500 Hz)

The different "energy values" characterizing the pulsed YAG laser beam are:

the mean power (W) (energy per pulse)×(repetition frequency), the energy per pulse (J), the peak power (kW) (energy per pulse)/(duration of the pulse).

The technology of the YAG pulsed laser is particularly interesting since it is possible to modulate and optimize the pulse parameters for each application case and to attain good performance for scribing, welding, surface treatment and drilling.

For example, if the beam is transmitted via optical fiber (of 1 mm diameter), it is possible to cut a 30 mm stainless steel plate, when assisted by an oxygen jet, if the beam has the following parameters:

mean power: 900 W, energy per pulse : 90 J peak power: 18 kW.

Energy parameters even higher than those shown above are envisaged in the field of dismantling nuclear installations by YAG pulsed laser.

For example, with direct firings (that is to say, without transport of the beam by an optical fiber), at 1300 W mean power, 130 J per pulse and 22 kW of peak power, it is possible to achieve a cut thickness of 50 mm (304 L stainless steel), with good cutting quality.

On the other hand, continuous progress in the technology of the industrial YAG laser has allowed the achievement today of mean powers of 2000 W and energies per pulse of 200 J. Three thousand W prototypes are in the process of being developed.

If a pulsed YAG laser beam, having increased energy parameters, is used in combination with an optical fiber, the end of which is held in a connector of the type described in the prior art, then the life of the fiber input surface is very short. Hence for a mean power of 900 W, an energy per pulse of 90 J and a peak power of 18 kW, the life of the input face of the fiber is about 5 minutes. Heating of the fiber to its softening temperature is also observed, and the input surface of the fiber sublimes little by little until its complete destruction occurs. It is therefore necessary to provide an optical fiber connector that allows resolution of this problem.

Furthermore, a maintenance problem is also posed for the input surface of the fiber which, even if it is not destroyed needs to be checked, and even repolished. The reasons why repeat polishing of the input surface is necessary are manifold. They are, for example:

the laser energy parameters which slowly damage the input surface of the fiber, the possible deposition of dust on the input surface of the fiber, creating local hot spots, a slight axial defocusing of the beam on the input surface of the fiber, which results in heating of the periphery of the fiber, a slight transverse defocusing of the beam on the input surface of the fiber, which results in an asymmetrical temperature rise on one edge of the fiber, residual micro scratches, arising from previous polishing, which reduce the life of the input surface, residual traces of solvent, arising from previous cleaning, which reduce life of the input surface of the fiber.

These different phenomena necessitating repolishing the input surface of the fiber are, in practice, more or less cumulative and difficult to identify, especially when the input surface of the fiber is really damaged.

Consequently, the fiber must be capable of being dismantled from its connector before being repolished, and then reassembled with its connector after polishing. During this operation, it is necessary to avoid as much as possible, any risk of damaging the input surface of the fiber, e.g.

chipping of the fiber that can arise if the input surface comes into contact with another element of the optical device.

SUMMARY OF THE INVENTION

The subject invention is a connection device for an optical fiber or a connection device for injecting a laser beam into an optical fiber, comprising:

two half grips for receiving one end of the optical fiber in a gripped position, a connector body for receiving the two half grips and for holding them in an optical fiber gripped position cooling means for cooling the two half grips.

Due to the use of the two half grips an effective thermal contact is created between the grips and the end of the fiber. Since the grips are cooled, the risk of softening and destroying the end of the fiber is eliminated.

Effective cooling, moreover, allows one to use smaller diameter fibers and to accept lower quality polishing for the end of the fiber.

Furthermore, as the overall grip is formed of two half parts, it is possible to open the grip so as to gain direct access to the fiber without damaging it.

For prior art connectors, polishing is carried out with the connector. Fragments of abrasive material can therefore remain at the interface between the end of the fiber and the mechanical part of the connector. These deposits of abrasive material can migrate onto the input surface of the fiber in course of time. Furthermore, cleaning of the end of the fiber is difficult to carry out completely when it is integral with a mechanical system, since accessibility to the end of the fibre is limited or even impossible.

With the connector system according to the invention, the fiber can be removed from the grip. Hence before reassembling it in the connector, after repolishing the input surface, it is possible to clean it completely over a length of several centimeters. Furthermore, when the fiber is reassembled in the grip, after repolishing, the risk of damaging the end of the fiber against the element which is used to support it, is very limited.

Hence, the means provided facilitate the operations of assembling and dismantling the device and therefore the maintenance of the fiber.

According to one particular embodiment, the body is a single component.

The cooling system can then comprise cooling means for the body which cools the two half grips conduction.

The two half grips can be in the shape of a truncated cone, the body including a seat for receiving the two half grips, also being in the shape of a truncated cone.

In addition, means of adjusting the clamping of the two half grips against the truncated seat can be provided.

Such means may comprise, for example, an inner screw for being screwed onto the body.

According to another embodiment, the body is itself formed in two pieces, each being for receiving a half grip.

This second embodiment allows the risks of contact of the input surface of the fiber with another element to be avoided even more. In effect, it is then not only the grip which can be opened into two parts, but also the connector itself.

A circulation channel for a cooling fluid can also be provided in the body so that, the fluid may be brought into contact with the half grips in order to wash against them.

This cooling system is more effective than that already described above in connection with the first embodiment.

Means can also be provided for pressing the half grips against the fiber in a direction substantially perpendicular to an axis defined by the position of the fiber.

Such means can, for example, comprise at least one spring, in compression between one of the two half grips and the half body for receiving that half grip.

The use of the means for pressing the half grips against the fiber allows effectiveness of the cooling to be increased still more.

Each half grip can be in the shape of a cylinder incorporating several indentations, to fit different fiber diameters. Hence it is not necessary to change the half grips when a fiber of another diameter must be used: the connector is already adapted for use with different fiber diameters.

After dismantling the fiber, it is advantageous not to have to recenter it with respect to the incident laser beam. Consequently, the body of the connector is advantageously held in a fixed position with respect to the laser. In the case of the second embodiment, one of the two components which forms the body can be held in a fixed position with respect to the laser.

BRIEF DESCRIPTION OF THE DRAWINGS

The characteristics and advantages of the invention will become more apparent in light of the description that follows. This description is supported by examples of embodiments of the invention, which should be considered as being non-limiting and are given for explanation purposes only, with reference to the appended drawings in which:

FIGS. 3 to 4B illustrate a first embodiment of a connector according to the invention, FIGS. 5A to 5C illustrate another embodiment of a connector according to the invention.

DETAILED DESCRIPTION OF PREFERRED EMBODIMENTS

Figure 1:
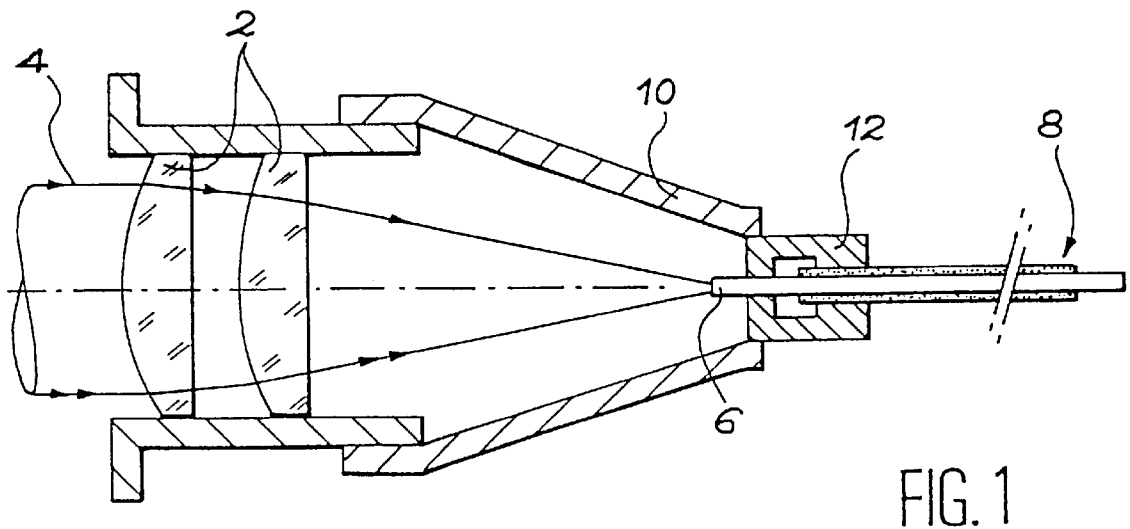
FIG. 1 shows diagrammatically, an optical fiber, a connector and an incident laser beam.
Figure 2:
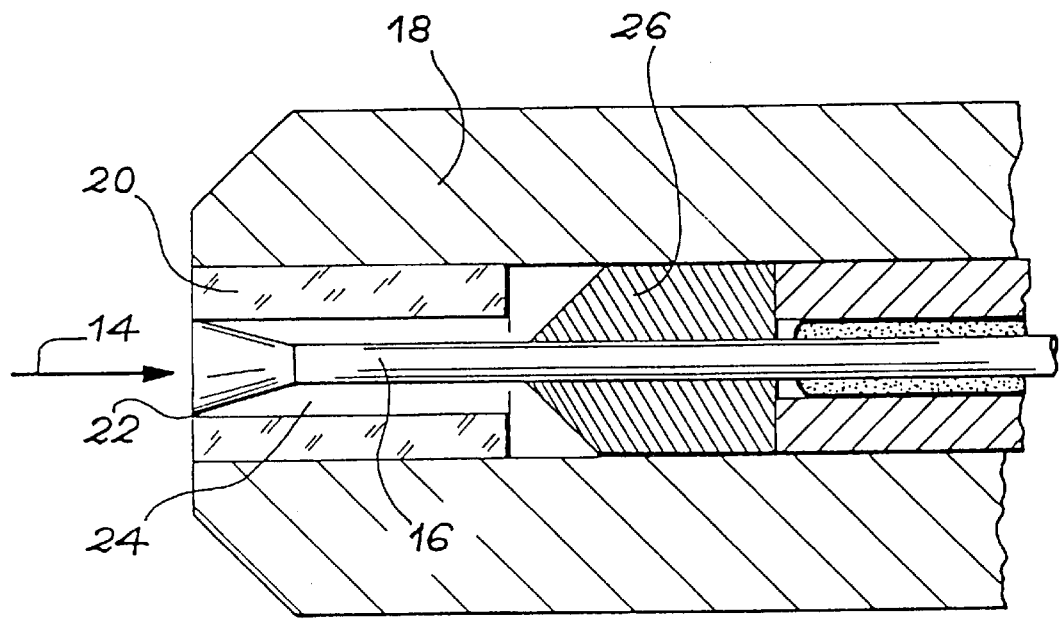
FIG. 2 shows a connector according to the prior art.

A first embodiment of the invention will be described in connection with FIGS. 3 to 4B. FIGS. 4A and 4B are sectional views along planes I—I and II—II respectively.

In these Figures, the end 32 of an optical fiber 30 is received in a gripped position between two half grips 34, 36, of substantially conical or truncated conical shape. These two half grips are mounted inside a body 38. The body is a one piece component, and incorporates water circulation for cooling the end of the fibre. The water comes in via a pipe 40, circulates within a jacket 42 and leaves the body 38 via pipe 44. The body 38 cools the two half grips 34, 36, by conduction, and they, in turn, cool the end 32 of the fiber 30. The two half grips 34, 36 have an indentation 46 that fits the diameter of the optical fiber.

The body 38 includes a hollowed out part or seat 48 intended to receive the half grips 34, 36. Means for adjusting the clamping of the two half grips against this seat can be provided; good clamping allows good thermal contact between the half grips and body 38, and as a consequence, good cooling of the end of the fiber. In the example in FIG. 3, clamping means essentially comprises an inner screw 50 which is screwed into the interior of the body 38.

Furthermore, the fiber rests on a lower half cradle 52, which permits the part of the fiber that has not been bared to be immobilized. As shown in FIG. 4B, the fiber is held on the lower half cradle 52 by a collar 54 and two clamping screws 56.

An upper half cover 58 caps the lower half cradle 52.

A nut 60 fulfills the function of a packing gland. When this nut is tightened, the rear part of the half cradle 52 and the half cover 58 are deformed so as to clamp a protective flexible metal conduit 62.

This device allows satisfactory cooling of the end of the optical fiber to be obtained when a pulsed high energy laser beam, notably a YAG laser beam is introduced into it.

Another embodiment of the present invention will be described in connection with FIGS. 5A to 5C.

In FIG. 5A, the optical fiber connector is made up of a lower half connector 64, cut off along its median plane. This half connector is divided into three parts 66, 68, 70. To make up the connector, three separate sub-assemblies 72, 77, 79 cap the half connector 64. Part 72 is applied against part 66, part 77 is mounted onto part 68 and part 79 onto part 70.

Figure 6:
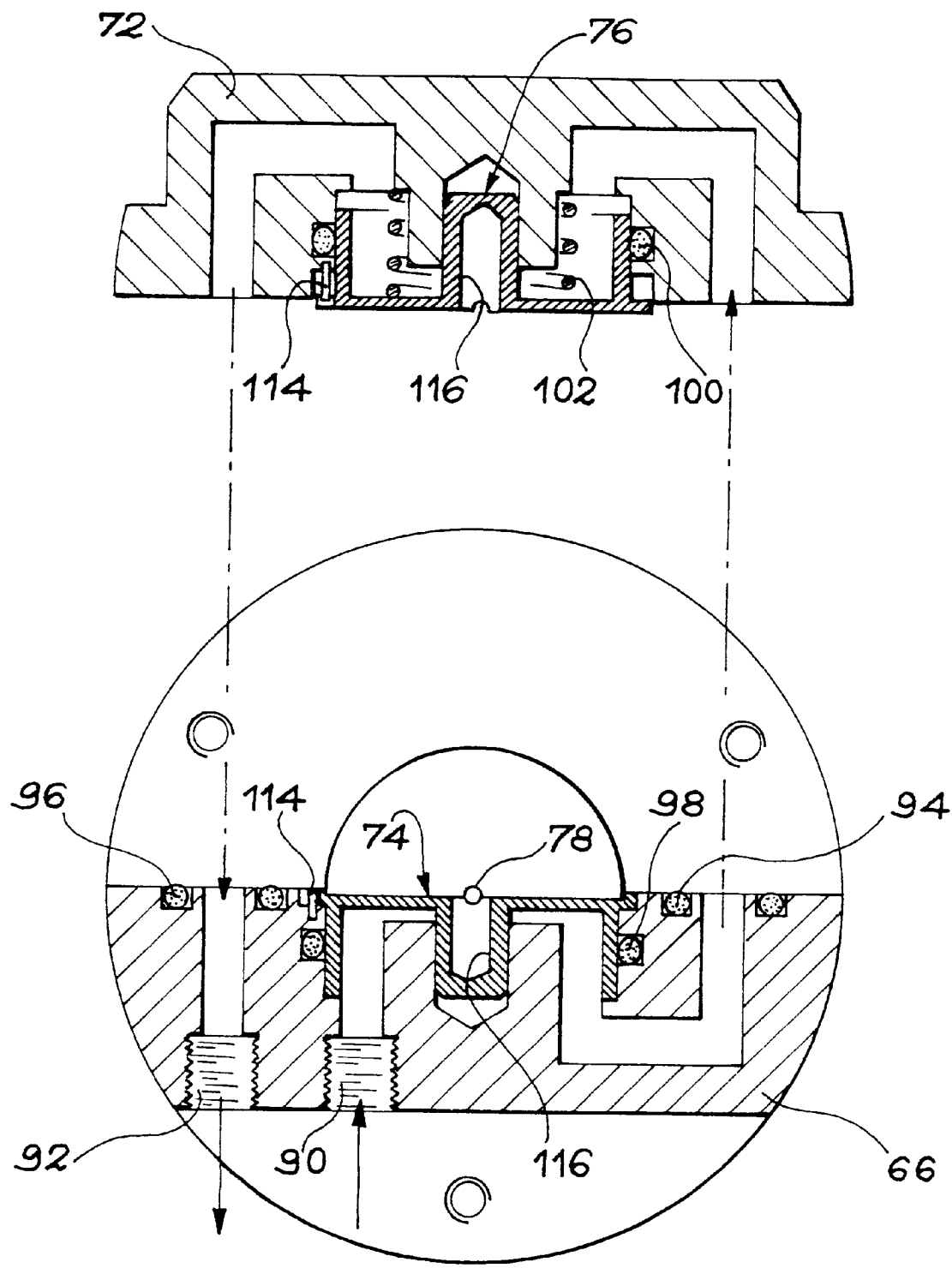
FIG. 6 shows a body made in two parts and two half grips for a connector according to the invention.

In the front part of the connector, a connector body is formed by the two lower and upper parts 66, 72 also called lower and upper half bodies. Into each of these parts a half grip 74, 76 is inserted which in turn cool the end of the fiber. As may be seen more clearly in FIG. 6, a cooling fluid (generally water) circulation loop is provided in the two parts 66, 72 of the body in such a way that the fluid washes against each of the two half grips 74, 76. The cooling liquid passes in through orifice 90, cools the lower grip 74, then passes into the upper half body 72 to cool the upper grip 76 and finally passes again into the lower half body 66 and exits via an orifice 92. Toroidal sealing rings 94, 96 form the seal between half body 66 and half body 72. Likewise, toroidal sealing rings 98, 100 allow sealing between each of the two half bodies 66, 72 and the corresponding half grip 74, 76. In the upper part, a spring 102 is positioned, in compression, between the half body 72 and the corresponding half grip 76. This spring permits good contact and hence good thermal exchange to be achieved automatically between the end of the fiber and the two half grips 74, 76, during assembly of the upper half body onto the lower half body. This good contact encourages good thermal exchange and good cooling of the end of the fiber.

Figure 7:
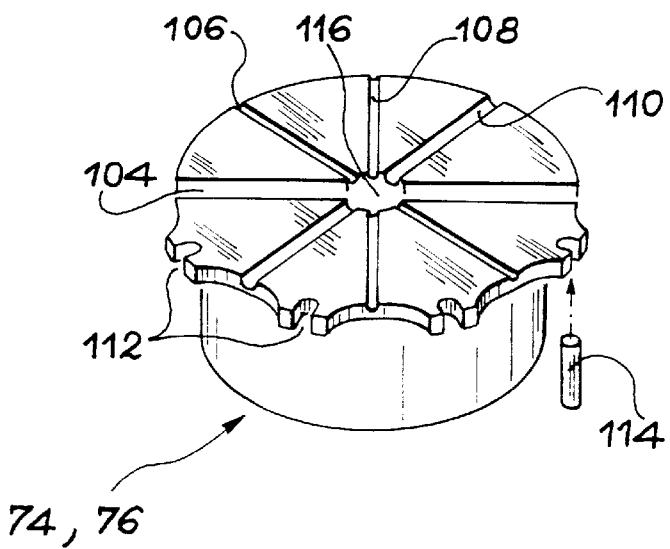
FIG. 7 shows, diagrammatically, a half grip for a connector according to the invention.

Each half grip can have the shape of a cylinder and can be given indentations, designated in FIG. 7 by reference numbers 104, 106, 108, 110. These indentations have different sizes and therefore fit different fiber diameters. Each fiber position is indexed by means of a recess 112 in the two half grips 74, 76 and two guide pins 114 (see FIG. 6), each of which is situated in a half body 66, 72. These guide pins also bring about centering of the half body 72 on the upper surface of the lower half body 66. Tappings 116 (see FIG. 6) in the center of each half grip 74, 76 have the function of allowing extraction of the half grips from their indexed locations 112, 114. It is then possible, by rotating the half grips, to bring into line a new indentation corresponding to a different fiber diameter.

FIG. 5B shows how the end of the fiber 78, on leaving the half grip 74, passes into an indentation 75 made in the half body 66. This indentation has the function of preventing the end of the fiber 78 from coming into contact with the lower half body 66 or the upper half body 72. The latter has the same indentation.

In the central part of the connector, the cover 77, fixed to part 68, allows the fiber 78 to be clamped onto the lower half connector. Furthermore, an adapter 80 is provided which receives the fiber 78. The end of this adapter is shown in more detail in FIG. 5C: one can see that it has grooves 82, 84, 86 having different diameters so that fibers of different sizes can be received.

In the rear part of the connector, a cover 79 is positioned on surface 70. This rear part has the function of clamping together a flexible metallic conduit 81 to protect the optical fiber. This metal conduit also protects the users against laser radiation, in the event of rupture of the fiber.

A hood, not shown in FIG. 5A, caps the connector assembly.

In all the embodiments described above, the body or one of the half bodies can remain permanently on the laser during any fiber maintenance operation. This avoids having to recenter the end of the fiber with respect to the incident beam after taking off the fiber.

A connector according to the first embodiment, as described above in connection with FIGS. 3 to 4B, has been tested. In order to make a comparison, it must be remembered that the life of the end of a fiber is only about 5 minutes with a connector according to the prior art, under the following energy parameter conditions:

mean power: 900 W, energy per pulse: 90 J/pulse peak power: 18 kW.

Test of the connector according to the invention has been carried out with more "aggressive" parameters; in fact, a high energy YAG pulsed laser (model IQL 40) was operated with the following parameters:

mean power: about 1300–1400 W, energy per pulse : about 130–140 J/pulse (for a pulse duration of 5 milliseconds), peak power: about 26–28 kW.

Figure 8:
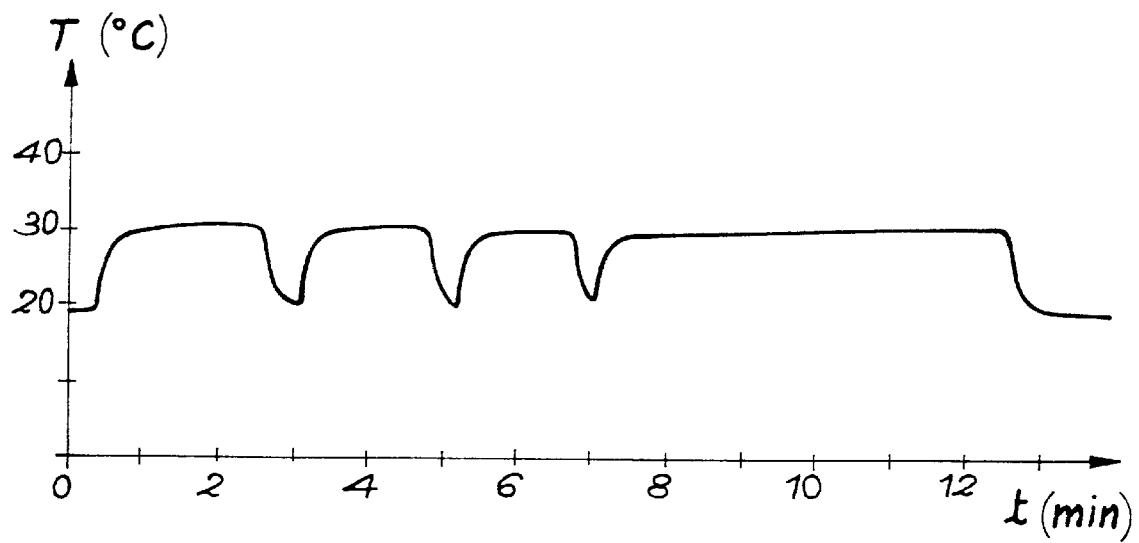
FIG. 8 shows variations in temperature of a grip, as a function of time, in a connector according to the invention.

FIG. 8 shows a record of the temperature reached by the grip carrying the fiber (at about 1 mm from the edge of the fiber), as a function of time, for three short firings and for a longer firing.

The test shows that the temperature stabilized very rapidly, in a time of less than 1 minute, at about 10° C. above the temperature of the cooling water.

The dips in the curve correspond to the laser being off.

We claim:

1. A connection device for injecting a laser beam into an optical fiber, comprising:

two half grips for receiving one end of the optical fiber in a gripped position, a connector body for receiving the two half grips and for holding the two half grips in an optical fiber gripped position, and cooling means for cooling the two half grips and to thereby cool at least an end of the fiber via heat conduction.

2. A device according to claim 1, wherein the body comprises a one-piece component.

3. A device according to claim 2, wherein the cooling means is in contact with the body, and is adapted to cool the two half grips by conduction.

4. A device according to claim 2, wherein the two half grips each have a truncated conical shape, and the body includes a truncated conical seat for receiving the two half grips.

5. A device according to claim 4, further comprising, means for adjusting clamping of the two half grips against the truncated conical seat.

6. A device according to claim 5, wherein the adjusting means comprise an inner screw for screwing onto the body.

7. A device according to claim 1, wherein the body includes two half bodies, each half body being for receiving a half grip.

8. A device according to claim 7, wherein said cooling means comprises a circulation channel in said body for receiving the two half grips for permitting a cooling fluid to contact and wash against the half grips.

9. A device according to claim 8, further comprising, means for pressing the half grips against the fiber in a direction substantially perpendicular to an axis defined by position of the fiber.

10. A device according to claim 9, wherein the means for pressing the half grips against the fiber includes at least one spring, in compression between one of the half grips and one half body for receiving the one half grip.

11. A device according to claim 8, wherein each half grip has a cylindrical shape and includes several indentations for receiving fibers of different diameters.

12. A device according to claim 7, wherein each half grip has a cylindrical shape and has several indentations for receiving fibers of different diameters.

13. A device according to claim 7, further comprising means for pressing the half grips against the fiber in a direction substantially perpendicular to an axis defined by position of the fiber.

14. A device according to claim 13, wherein the means for pressing the half grips against the fiber comprises at least one spring compressed between one of the half grips and one half body for receiving the one half grip.

15. A device according to claim 14, wherein each half grip has a cylindrical shape and includes several indentations for receiving fibers of different diameters.

16. A device according to claim 13, wherein each half grip has a cylindrical shape and includes several indentations for receiving fibers of different diameters.

17. A device according to claim 1, wherein the cooling means is in contact with the body, and is adapted to cool the two half grips by conduction.

18. A device according to claim 1, wherein the body is held in fixed position with respect to a laser.

* * * * *